US005555175A

United States Patent [19]

D'orso

[11] Patent Number: 5,555,175
[45] Date of Patent: Sep. 10, 1996

[54] METHOD AND DEVICE FOR ASSISTANCE WITH THE PILOTING OF AN AIRCRAFT

[75] Inventor: Michel D'orso, Luynes, France

[73] Assignee: Eurocopter France, Marignane Cedex, France

[21] Appl. No.: 337,248

[22] Filed: Nov. 10, 1994

[30] Foreign Application Priority Data

Nov. 10, 1993 [FR] France .................................. 93 13428

[51] Int. Cl.⁶ .............................. G06F 165; G01S 17/93
[52] U.S. Cl. ............................................ 364/433; 364/461
[58] Field of Search ...................... 364/433, 461, 364/451, 424.06; 244/180, 181; 342/29, 47, 63, 65; 348/115, 117; 345/7

[56] References Cited

U.S. PATENT DOCUMENTS

| | | | |
|---|---|---|---|
| 3,686,626 | 8/1972 | Bateman et al. | 340/27 NA |
| 3,784,800 | 1/1974 | Willoteaux | 235/150.27 |
| 3,810,175 | 5/1974 | Bell | 343/7 TA |
| 4,068,124 | 1/1978 | Kleider | 250/332 |
| 4,646,244 | 2/1987 | Bateman et al. | 364/461 |
| 4,902,126 | 2/1990 | Koechner | 356/5 |
| 5,192,979 | 3/1993 | Grage et al. | 356/28.5 |
| 5,210,586 | 5/1993 | Grage et al. | 356/5 |
| 5,315,296 | 5/1994 | Kaiser et al. | 340/946 |

FOREIGN PATENT DOCUMENTS

| | | |
|---|---|---|
| 2643526 | 12/1977 | Germany . |
| 3501954 | 7/1986 | Germany . |

OTHER PUBLICATIONS

Suorsa et al., *Validation of Vision–Based Obstacle Detection Algorithms For Low–Altitude Helicopter Flight*, proceeding of The SPIE–International Society for Optical Engineering, vol. 1388 pp. 90–103, 1991.

*Primary Examiner*—Michael Zanelli
*Attorney, Agent, or Firm*—Marshall, O'Toole, Gerstein, Murray & Borun

[57] ABSTRACT

The present invention relates to a method of assisting the piloting of an aircraft at low altitude. According to the invention, a hypothetical curve associated with an optimal theoretical trajectory for clearing an obstacle is calculated and, in the field in front of the aircraft: all the obstacles situated in a search area are determined; the tops of the obstacles determined are compared with the hypothetical curve; an obstacle is defined as a dangerous obstacle if the top of the obstacle is situated highest with respect to the hypothetical curve; and the coordinates of the top of the dangerous obstacle are communicated.

24 Claims, 4 Drawing Sheets

METHOD AND DEVICE FOR ASSISTANCE WITH THE PILOTING OF AN AIRCRAFT

BACKGROUND OF THE INVENTION

The present invention relates to a method and a device for assistance with the piloting of an aircraft, making it possible, in particular, to determine the obstacles which are dangerous for said aircraft in its flight space.

In flight at low altitude, the pilot of an aircraft, in particular of a helicopter, sees in front of him, at low incidence angles, a very large number of points on the ground or of obstacles which he generally locates well in direction but not always in distance.

The intellectual processing of this set of poorly located points often represents a heavy and difficult workload, all the more so since visibility may be poor and the obstacles too thin to be distinguished from afar.

These drawbacks are particularly perceptible when the pilot is using night vision devices or cameras which give an image without color or relief in a reduced field.

SUMMARY OF THE INVENTION

The object of the present invention is to remedy these drawbacks. It relates to a method of assistance with the piloting of an aircraft, in particular for flights at low altitude, making it possible to detect the obstacles which are dangerous for said aircraft.

To this end, according to the invention, the method of assisting the piloting of an aircraft at low altitude, making it possible to detect the obstacles in relief which are dangerous for said aircraft in the field in front of the latter, is noteworthy in that:

- on the basis of the maneuvering capabilities of the aircraft, a hypothetical curve is calculated, related to said aircraft and associated with an optimal theoretical trajectory for clearing an obstacle in a vertical plane; and
- in the field in front of the aircraft, the following steps are performed:
    a) all the obstacles situated in a search area are determined;
    b) the tops of said obstacles determined are compared with said hypothetical curve;
    c) that obstacle is defined as dangerous whose top is situated highest with respect to said hypothetical curve; and
    d) the coordinates of said top of this dangerous obstacle are communicated.

Thus, by virtue of the invention, it is possible, among all the potential obstacles, visible or not to the pilot, to identify the obstacle presenting an immediate danger and, if it is on the trajectory of the aircraft, necessarily giving rise to an immediate avoidance maneuver on the part of the pilot.

Moreover, this reduction in the number of obstacles to be taken into account considerably eases the task of observation by the pilot.

Advantageously, the field in front of the aircraft is subdivided into angular sectors and, in each of said angular sectors, said steps a, b, c and d are performed. Thus, the pilot has available an aid not only to vertical avoidance, in a defined direction, but also an aid for lateral avoidance, on the basis of the information obtained from each of said angular sectors.

Advantageously, furthermore, in each of said angular sectors, the coordinates of a reference point situated at a predefined distance above the top of the dangerous obstacle are calculated, said predefined distance corresponding to the minimum desired height for overflying an obstacle.

Thus, by presenting said reference point to the pilot, he is shown the point in space through which he has to pass in order to perform the most advantageous overflight of the dangerous obstacle, that is to say as low as possible and presenting no risk of collision. Obviously, said minimum overflight height is adapted to the characteristics of the aircraft and to the type of mission to be carried out. By way of example, a height of 20 meters may be envisaged for a helicopter.

In order to present the preceding results as effectively as possible to the pilot of the aircraft, characteristic signs are superimposed on the image of the external landscape, which are arranged at the points in space corresponding to said determined coordinates.

Thus, when these coordinates are those of the reference points, the pilot directly sees the point in space through which he has to pass in order to perform an optimal overflight. When these coordinates are those of the tops of the dangerous obstacles, this superimposition makes it possible to reveal these dangerous obstacles which are not always clearly visible directly, and the ease of recognition of which often varies with the metereological conditions. This superimposition consequently offers the pilot an effective aid to observation, by facilitating recognition of the dangerous obstacles, above all in conditions of poor visibility.

Advantageously, a piloting curve is determined, corresponding to a smoothed curve linking all said reference points and said piloting curve, as well as a characteristic sign indicating the position of the speed vector of the aircraft collimated at infinity are superimposed on the image of the external landscape.

This piloting curve thus divides the image of the external landscape into two parts, a lower part which lies between the ground and said piloting curve and which the aircraft must avoid at all costs, by reason of the presence of said dangerous obstacles, and an upper part which is situated above said piloting curve and which includes no dangerous obstacle. It will be noted, moreover, that, in order to perform a flight both as low as possible and without danger for the aircraft, it is sufficient for the pilot to steer the aircraft towards a point of said piloting curve since, by definition, this piloting curve links together the reference points which are defined, as described previously, by taking account of the minimum height for overflying an obstacle.

Consequently, in order to perform an optimal overflight, it is sufficient for the pilot to steer the aircraft so as to superimpose on said piloting curve said sign which is characteristic of the speed vector, which, obviously, indicates the direction of flight of the aircraft.

By virtue of the invention, it is thus possible to perform directional guidance by superimposition of the speed vector and of the piloting curve.

It will be noted, moreover, that said piloting curve will implicitly furnish a distance indication, since the angular offset between the top of an obstacle and the piloting curve is proportional to the distance between this obstacle and the aircraft.

In order not to overload the image of the external landscape, sent to the pilot, advantageously only the central part of said piloting curve including the points in space which are accessible to the aircraft with a predefined limit roll are superimposed on said image of the landscape. This then makes it possible, moreover, to indicate clearly to the pilot the part of space which he is capable of reaching from his current position. Moreover, the continuous presence of all of this accessible part of the piloting curve allows the pilot to keep a check on the consistency of said piloting curve with the r al obstacles seen. It will be noted that the value of said limit roll depends, in particular, on the type of aircraft in question. For a helicopter, for example, a value of 45° may be used.

It will be noted that the piloting, by super-imposition of the speed vector and of the piloting curve, does not always make it possible to pass exactly horizontal, at the minimum overflight height, above the obstacle in question. In order to remedy this drawback, while allowing the aircraft more rapidly to reach the height sought in order to be placed in horizontal position before the overflight, it can be guided with the aid of a piloting curve offset towards the aircraft, determined in a way identical to said piloting curve, by using, in the calculation, modified coordinates of the dangerous obstacles, obtained in each case by the reduction according to the same ratio, for example one quarter, of the horizontal component of said coordinates.

Advantageously, moreover, an auxiliary piloting curve is calculated, determined in a way identical to said piloting curve, by taking account of the obstacles situated at a longer distance from the aircraft than said dangerous obstacles, and said auxiliary piloting curve is superimposed on the image of the external landscape, for example by way of a trace in broken lines, so as to differentiate it from said piloting curve. This auxiliary piloting curve makes it possible to reveal the obstacles which are situated further than the dangerous obstacles of the piloting curve and which are to be taken into account after said dangerous obstacles have been cleared. This information may, in particular, assist the pilot in the choice of a possible lateral diversion.

It is also possible to use said auxiliary piloting curve differently, without superimposing it on the image. It is possible, for example, to use the information supplied by said auxiliary piloting curve to differentiate certain parts of the piloting curve, by indicating to the pilot the directions to be avoided, that is to say those where the auxiliary piloting curve is high, and the directions to seek, that is to say those where the auxiliary piloting curve is low. This differentiation may be obtained by different thicknesses of the trace of the piloting curve, by the use of dotted lines or of colors.

Advantageously, an optimal avoidance point is determined, corresponding to the point of the piloting curve towards which the aircraft has to steer in order to perform the optimal avoidance trajectory above the obstacles.

According to the invention, in order to determine said optimal avoidance point:

for each reference point of the piloting curve, a compensated relative distance D satisfying the relationship D=h+kv is calculated, h being the horizontal distance and v the vertical distance between said reference point and the position of the speed vector, and k being a predefined coefficient;

said calculated compensated relative distances are compared with each other; and the optimal avoidance point is determined as being the reference point the compensated relative distance of which is smallest.

It may sometimes be sufficient, for determining the optimal avoidance point, to use only the reference points of three angular sectors, namely the central angular sector in front of the aircraft, in which the speed vector lies, as well as the adjacent angular sectors situated respectively to right and to left of this central angular sector.

Said optimal avoidance point may be used in two different ways. On the one hand, a characteristic sign arranged at said optimal avoidance point may be superimposed on the image off the external landscape. Thus, in order to perform an optimal avoidance, it is sufficient to make the sign characteristic of the speed vector correspond with said sign characteristic of the optimal avoidance point. Moreover, it is possible to communicate the coordinates of said optimal avoidance point to the automatic pilot of the aircraft, in order to perform automatic avoidance.

Moreover, a characteristic sign arranged at the point of said piloting curve through which said aircraft will pass while keeping its current roll is superimposed on the image of the external landscape.

Advantageously, said hypothetical curve consists of a straight-line part, of length P, parallel to the speed vector of the aircraft and of a circular arc, of radius R, depending on the maneuvering capabilities of the aircraft, for pitch-up and pitch-down, in the vertical plane.

Preferably, the length P of said straight-line part of said hypothetical curve is proportional to the speed of the aircraft, which makes it possible to obtain a duration (warning duration) which is necessary for the aircraft to cover the distance P, which is fixed whatever the speed of the aircraft. This fixed warning duration, for example 3 seconds or 5 seconds for a helicopter, corresponds to the maximum duration left available to the pilot to commence an avoidance maneuver, after having been made aware of the order to avoid a dangerous obstacle.

Moreover, the radius R of said circular arc satisfies the relationship R=Rc+Rp, with Rc the pitch-up limit radius, dependent on the pitch-up limit load factor, and Rp the pitch-down limit radius, dependent on the pitch-down limit load factor.

It will be noted that the pitch-down limit load factor is generally determined by taking account of considerations relating to the comfort of the pilot, since the capabilities of the aircraft in terms of load factor downwards are not greatly reduced as a function of mass, of temperature or of the atmospheric pressure. A value generally acknowledged by pilots is 0.6 g, g being the acceleration due to gravity.

In contrast, the pitch-up limit load factor capable of being taken by the aircraft depends very substantially on the previously quoted parameters, namely the mass, the temperature and the pressure, as well as on the speed and the attitudes of the aircraft.

Moreover, as the piloting curve is derived by the calculation of several points, it is possible either to take the same value for the calculation at each point of this piloting curve, or to take a different value having regard to the fact that the aircraft has to roll in order to reach the points of the piloting curve which are not exactly in front of the latter and that, therefore, this rolling reduces the limit load factor which it is capable of taking.

In the context of the present invention, it is thus possible to determine, in various different possible ways, said pitch-up limit load factor used for the calculation of the pitch-up limit radius Rc. For example, a fixed value may be taken which the aircraft is capable of taking throughout the flight envelope, or predefined values may be used varying as a function of the speed of the aircraft. According to another possibility, said pitch-up limit load factor may be determined directly from the temperature, the pressure, the mass and the speed of the aircraft.

Advantageously, in each angular sector, said search area is limited to a distance L from the aircraft, satisfying the relationship L=P+R, which avoids taking account of obstacles which cannot be defined as dangerous obstacles, since they are out of range of said hypothetical curve, of length L, related to the aircraft.

In order to implement the method according to the present invention, a device is provided including:

- a rangefinder sensor intended to measure the direction and the distance of all the obstacles situated in said search areas;
- a computer linked to said rangefinder sensor calculating said hypothetical curve on the basis of recorded data, defining the dangerous obstacles, and capable of calculating the coordinates of the reference points and said piloting curve; and
- a visual display device linked to said computer, capable of presenting to the pilot of the aircraft, in a fashion superimposed on the external landscape or on the image of the latter, the characteristic signs of said coordinates, said piloting curve, as well as the characteristic sign indicating the position of the speed vector.

Advantageously, said device includes an audible alarm, which is associated with a time base, which is linked to said visual display device and which is triggered when said speed vector is below said piloting curve for a predefined duration, for example half of the warning duration.

Moreover, said visual display device filters the variations in the piloting curve and presents to the pilot, progressively, the alterations in said piloting curve, which makes it possible to avoid abrupt jumps by the piloting curve which are likely to discomfort or tire the pilot needlessly.

BRIEF DESCRIPTION OF THE DRAWING

The Figures of the attached drawing will make it easy to understand how the invention can be produced. In these Figures, identical references designate similar elements.

DETAILED DESCRIPTION OF A PREFERRED EMBODIMENT

Figure 1A:
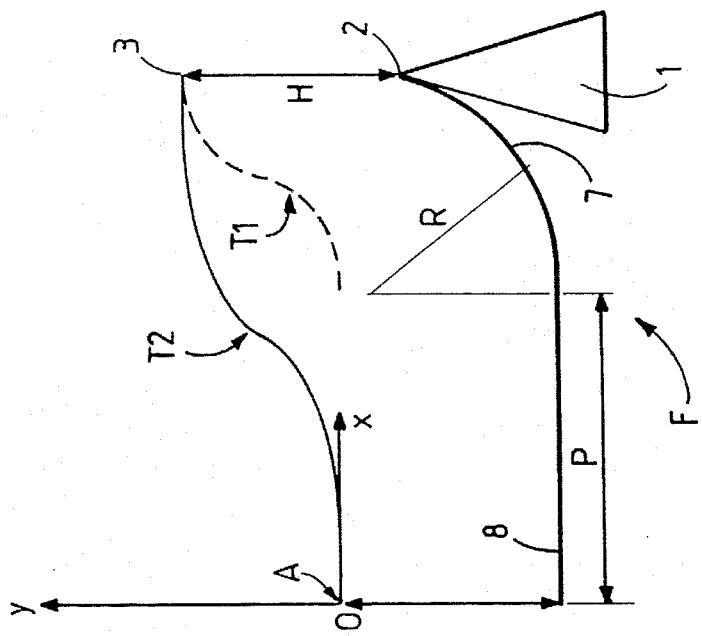
FIGS. 1A, 1B and 1C illustrate the derivation of a hypothetical curve associated with an optimal trajectory for clearing an obstacle.

The present invention is intended to assist the pilot of an aircraft, in particular of a helicopter, to maintain the lowest possible trajectory in a dangerous environment, by indicating to said pilot the obstacles which are dangerous for said aircraft in its flight space.

For determination of these dangerous obstacles, a hypothetical curve F is used, related to the aircraft A, the mode of derivation of which is explained below, with reference to FIGS. 1A, 1B and 1C.

The calculation of the hypothetical curve F is performed in a reference system (Ox, Oy), the origin O representing the aircraft A, likened to a point, the axis Ox being parallel to the speed vector $\vec{v}$ of the aircraft A, in a horizontal direction in the example represented, and the axis Oy being perpendicular to the speed vector $\vec{v}$, that is to say vertical, and directed upwards in this example.

In order to clear an obstacle 1, represented diagrammatically, and to move to the horizontal, in line with its top 2, that is to say at the level of a point 3 situated slightly above said top 2, the aircraft A covers a trajectory T1 including, on the one hand, a circular arc 5 with radius of curvature Rc from the initial position at O up to a point 4, and, on the other hand, a circular arc 6 with radius of curvature Rp (not represented) from the point 4 up to the overflight point 3.

The radii of curvature Rc and Rp, corresponding respectively to the pitch-up and pitch-down limit radii, depend on the maneuvering capabilities of the aircraft A. They are calculated respectively from pitch-up and pitch-down limit load factors, as described previously.

The top 2, as well as the point 3, is on a circular arc 7, tangent to the speed vector $\vec{v}$ at the point O and having a radius R=Rc+Rp.

Figure 1B:
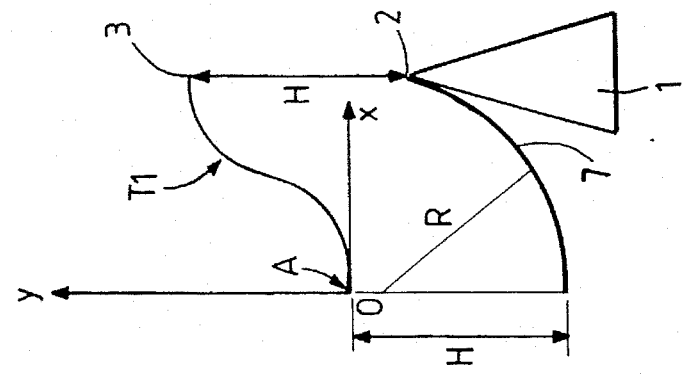

The trajectory T1, as it is represented in FIG. 1A, is the trajectory for clearing the obstacle 1 without a margin, since the overflight point 3 is slightly above the top 2 of the obstacle 1. In order to clear this obstacle 1 with a vertical margin H, corresponding, for example, to the minimum height prescribed for overflying an obstacle, the circular arc 7 is offset by a distance H downwards, with respect to the aircraft, that is to say along the Oy axis, in the direction of the negative coordinates, as represented in FIG. 1B.

Figure 1C:
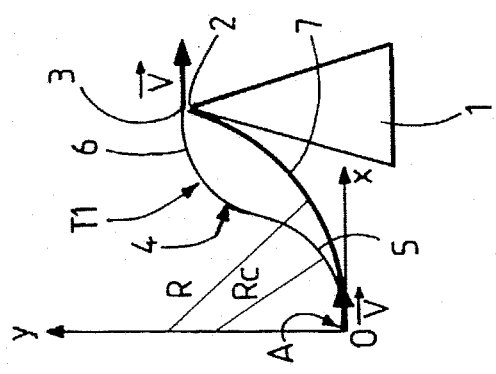

Moreover, in order for the pilot of the aircraft to have a certain reaction time DR (or warning time) available before commencing the maneuver for clearing the obstacle 1, the circular arc 7 is offset by a distance P forwards, that is to say along the Ox axis, as represented in FIG. 1C. It will be noted that, in order to have a fixed warning duration DR, for example 3 seconds, whatever the speed V of the aircraft, said distance P is defined to be proportional to this speed V, on the basis of the relationship P=DR.V.

Under these conditions, the aircraft A performs a clearance trajectory T2 corresponding to the optimal trajectory for clearing an obstacle, having regard to the maneuvering capabilities of the aircraft. The slopes of this trajectory T2 are softer than those of the trajectory T1 which has been represented in broken lines in FIG. 1C and which is a limit trajectory.

Thus the hypothetical curve F sought is obtained. The latter consists of a straight-line part 8 of length P and of the circular arc 7.

The steps previously described in order to explain the calculation of the hypothetical curve F make it possible clearly to reveal the advantage of this curve and to show its links with the theoretical trajectory T2 for optimal clearance.

It will be noted that the trajectory for clearance of an obstacle 1 is optimal, that is to say identical to said trajectory T2, if the clearance is triggered at the very moment when the obstacle 1 to be cleared touches said hypothetical curve F.

In the reference system (Ox, Oy), the circle (not represented) which includes the circular arc 7 has the equation:

$$(x-P)^2+[y-(R-H)]^2=R^2,$$

which has the root $y=R-H-\sqrt{(R^2-(x-P)^2)}$.

Consequently, in said reference system (Ox, Oy), the equation of the hypothetical curve F is:

$$y = -H \quad \text{for } 0 < x < P$$
$$y = R - H - \sqrt{(R^2 - (x-P)^2)} \quad \text{for } P < x < P+R$$

Said hypothetical curve F is thus limited to a distance L=P+R from the point O.

This hypothetical curve F is used to determine the obstacles which are dangerous for the aircraft, as will be seen below.

Figure 2:
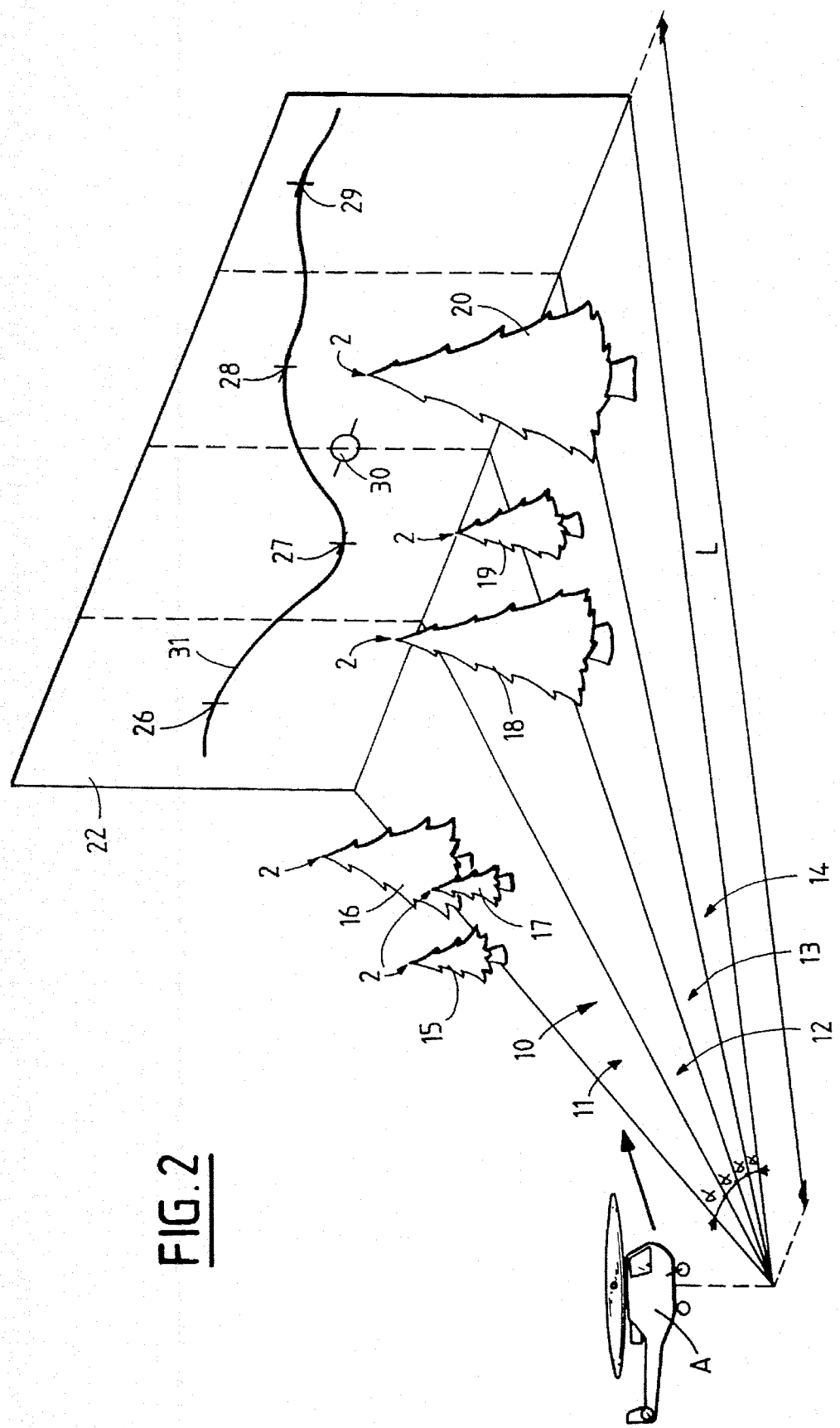
FIG. 2 diagrammatically illustrates the division of the field in front of the aircraft into angular sectors.

To this end, only a field 10 in front of the aircraft is of interest, as represented in FIG. 2, including at least the part of the space which the aircraft is capable of reaching from its current position, having regard to the characteristics of its dynamic performance. In accordance with the invention, said frontal field 10 is divided into angular sectors 11 to 14, with the same angular aperture $\alpha$.

In each of said angular sectors 11 to 14:

all the obstacles 15 to 20 situated in a search area, explained below, are determined, by means of a rangefinder detector, for example;

the tops 2 of said determined obstacles 15 to 20 are compared with said hypothetical curve F related to the aircraft and not represented in FIG. 2;

that obstacle is defined as dangerous obstacle 16, 18 and 20 whose top 2 is situated highest with respect to said hypothetical curve F; and the position of said top 2 of this dangerous obstacle 16, 18 and 20 is recorded.

Obviously, when a sector includes no apparent obstacle, as for example sector 12, a point 21 on the ground (see FIG. 3) is defined as dangerous obstacle.

In general, a rangefinder detector, such as for example a radar, is used, associated with a laser beam which regularly and systematically scans the space lying in front of said detector. Said detector, in each direction, specifically records the range of the ground which sends back an echo. All the points detected, such as for example trees, the ground or cables, of which the direction and the range with respect to the aircraft is therefore known, are considered as obstacles capable of being used in the implementation of the invention.

According to the invention, the altitude (coordinate along y, according to FIG. 1) of each obstacle is calculated, in a reference system related to the aircraft, for example. Next, the altitude difference between each obstacle y(O) and the corresponding point y(F) of the hypothetical curve F is calculated. The obstacle defined as dangerous is that whose difference y(O)−y(F) is the largest in algebraic value, whatever the nature of this obstacle (trees, ground, cable, etc.).

Furthermore, since the hypothetical curve F is, by definition, limited to the distance L=P+R, said search areas associated with the various angular sectors 11 to 14 are likewise limited to a distance L from the aircraft, since the obstacles which are situated at a greater distance are then out of range of the hypothetical curve F and can therefore not be defined as dangerous obstacles.

The foregoing results are then presented to the pilot of the aircraft, by superimposition on an image 22 of the external landscape, for example directly by means of a clear visor or of a helmet visor or by presentation on a screen (head-down or head midway) in superimposition with a camera image (visible or infrared spectrum).

Various modes of presentation are possible.

Figure 3:
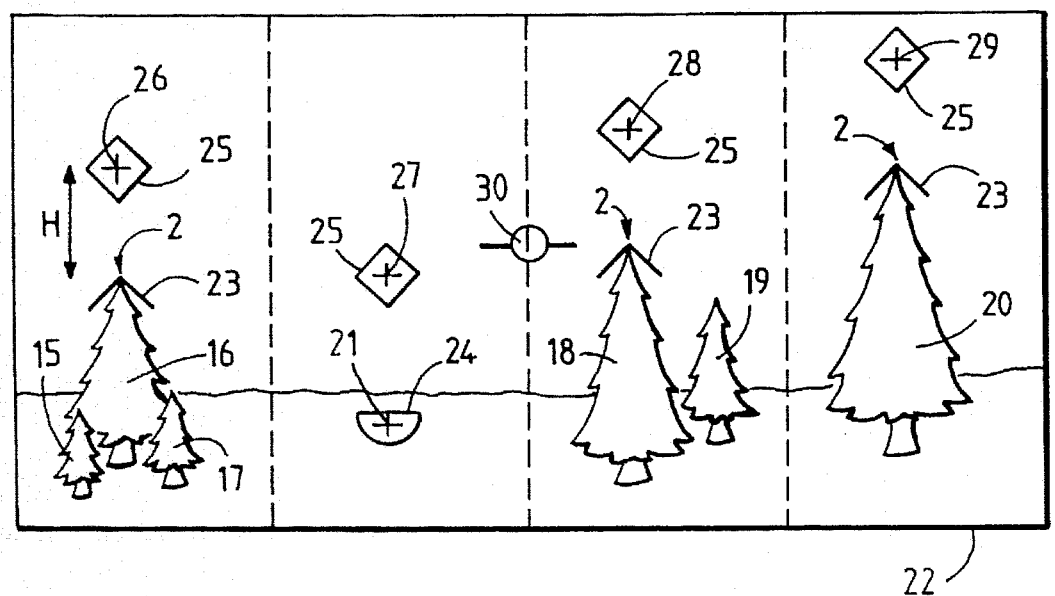
FIG. 3 shows a mode of presenting the results by superimposition on the image of the external landscape.

According to a first possibility, characteristic signs, in the form of reticles 23, arranged at the tops 2 of the dangerous obstacles 16, 18 and 20, are superimposed on the image 22 of the external landscape, as represented in FIG. 3.

This solution exhibits a double advantage. On the one hand, it makes it possible, among all the existing obstacles 15 to 20, to designate those which are defined as dangerous and on which the pilot should concentrate all his attention. On the other hand, it contributes effective assistance to observation, which is particularly useful in poor visibility, by indicating to the pilot the presence of obstacles which are possibly not recognized.

For the sake of clarification, a specific reticle 24 may be used when the dangerous obstacle relates to a point on the ground, such as, for example, the point 21.

According to another possibility, characteristic signs are superimposed on the image of the external landscape in the form of reticles 25 arranged at points in space 26 to 29 (reference points) lying at a determined height above the tops 2 of the dangerous obstacles. By using, as height, the minimum prescribed height H for overflying an obstacle, the pilot is clearly shown the point in space through which he has to pass in order to perform an optimal overflight, that is to say an overflight which is as low as possible and without danger of collision.

In order to facilitate such a maneuver, a reticle 30 is additionally superimposed on the image 22 of the external landscape, this reticle indicating the position of the speed vector of the aircraft collimated at infinity, that is to say the direction of flight of the aircraft A. Thus, in order to perform an optimal clearance of a dangerous obstacle 16, 18 or 20, it is sufficient for the pilot to steer the aircraft A in such a way as to superimpose the reticle 30 on the reticle 25 of the reference point 26, 28 or 29 associated with this dangerous obstacle 16, 18 or 20.

Figure 4:
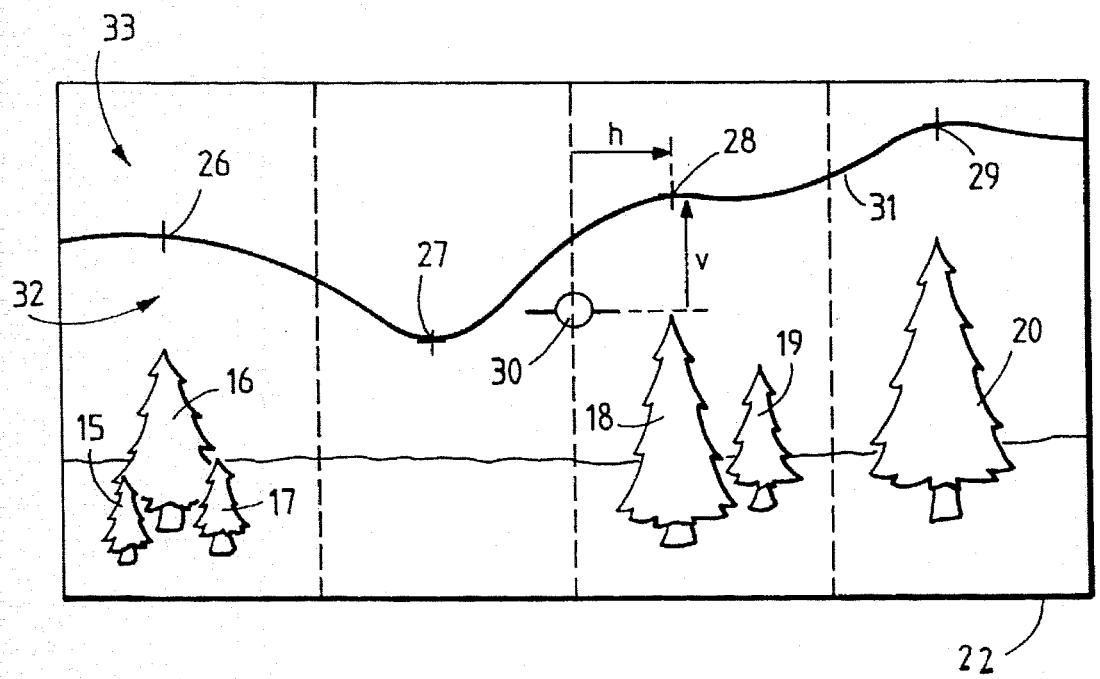
FIG. 4 shows another mode of results presentation, also by superimposition on the image of the external landscape.

According to a third information presentation possibility, a piloting curve 31 corresponding to a smooth curve linking all the reference points 26 to 29, is superimposed on the image 22 of the external landscape, as represented in FIG. 4. This piloting curve 31 divides the image 22 of the external landscape into two parts, a lower part 32 which the aircraft must avoid, by reason of the presence of dangerous obstacles 16, 18 and 20, and an upper part 33 including no dangerous obstacles. Thus, in order to perform the lowest possible flight without danger of collision, it is sufficient to pilot the aircraft A so as to superimpose the reticle 30 of the speed vector on said piloting curve 31.

Figure 5:
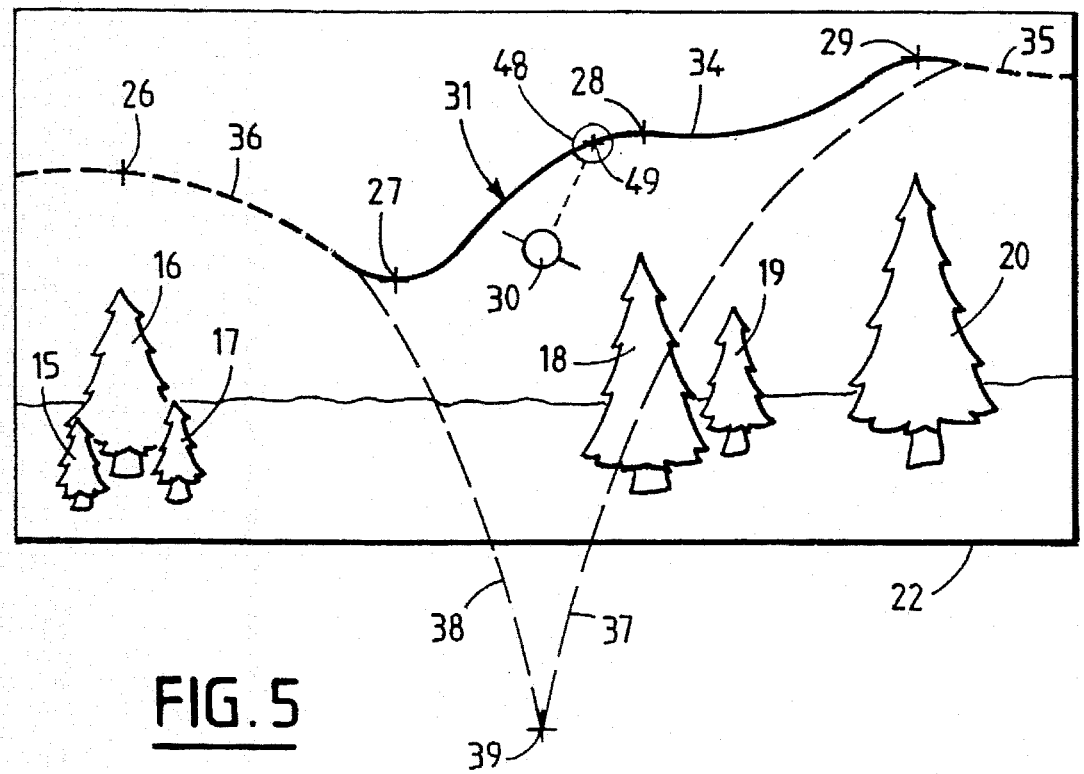
FIG. 5 illustrates the determination of the useful part of a piloting curve.

In order not to overload the image 22 sent to the pilot, only a central part 34 of said piloting curve 31 is represented, as represented in FIG. 5, by deleting the lateral parts 35 and 36 including points in space which are not accessible to the aircraft with a predefined limit roll. In this FIG. 5, traces 37 and 38 have been represented in broken lines, which correspond to the hypothetical trajectories at maximum roll, respectively to the right and to the left, capable of being performed by an aircraft located at a point 39.

It is obvious that the various points of said central part 34 of the piloting curve 31 are more or less easily accessible to the aircraft. In order to facilitate the choice by the pilot, an optimal avoidance point is determined, corresponding to the point of the central part 34 towards which the aircraft A has to steer in order to perform optimal avoidance trajectory above the obstacles.

To this end, the following steps are performed:

for each reference point 27 to 29 of the central part 34 of the piloting curve 31, a compensated relative distance D is calculated, satisfying the relationship D=h+kv, being the horizontal distance and v the vertical distance between said reference point 27 to 29 and the position 30 of the speed vector, as represented for the reference point 28 in FIG. 4, and being a predefined coefficient;

said calculated compensated relative distances are compared with each other; and the reference point whose compensated relative distance is smallest is determined as optimal avoidance point.

The coefficient is chosen to be positive and greater than 1, so as to favor lateral avoidance of an obstacle with respect to vertical clearance.

In order to assist the pilot to achieve a good trajectory, for example to pass between two high obstacles, a characteristic sign, in the form of a reticle 48, is superimposed on the point 49 of the piloting curve 31, through which the aircraft will pass if it maintains its current roll, said current roll being indicated by the position of the reticle 30 of the speed vector, as represented in FIG. 5.

Thus, for example, in order to pass between two high obstacles, it is sufficient for the pilot to steer the aircraft in such a way as to superimpose the reticle 48 on the point in space and on said piloting curve, through which he wants to pass, and for him to maintain this position.

Figure 6:
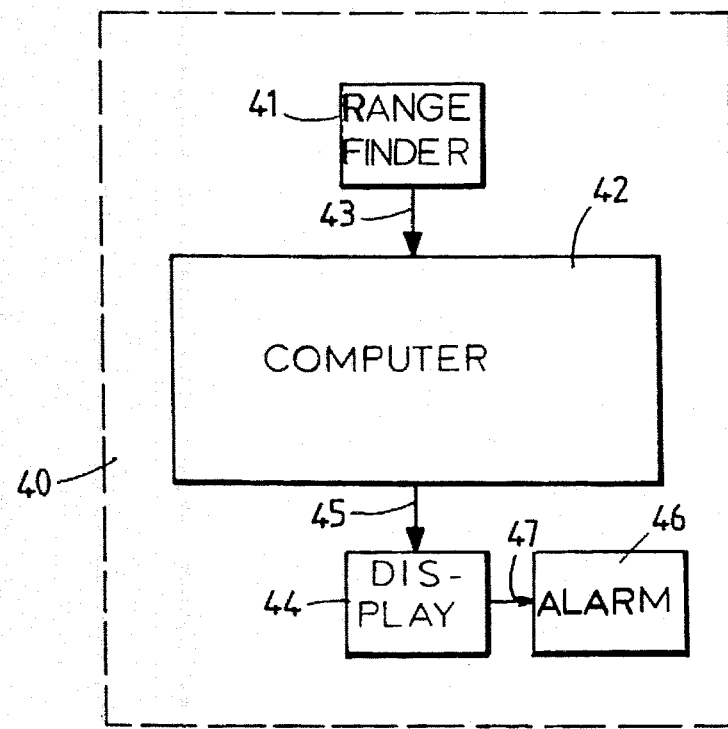
FIG. 6 is the block diagram of a device in accordance with the present invention.

In FIG. 6, a device 40 in accordance with the invention for implementing the method described above has been represented. This device 40 includes:

a rangefinder sensor 41 intended to measure the direction and the distance of all the obstacles 15 to 20 situated in the various search areas;

a computer 42 linked by means of a link 43 to said rangefinder sensor 41, calculating said hypothetical curve F on the basis of recorded data, defining the dangerous obstacles 16, 18 and 20, and capable of calculating the coordinates of the tops 2 of these dangerous obstacles, the coordinates of the reference points 26 to 29 and said piloting curve 31; and a visual display device 44 linked to said computer 42, by means of a link 45, and capable of presenting to the pilot of the aircraft, in a manner superimposed posed on the external landscape, said characteristic signs 23 and 25, said piloting curve 31, as well as the reticle 30 indicating the position of the speed vector.

Moreover, an audio alarm 46 associated with a time base, which is not represented, is linked to said visual display device 44, via a link 47. This audio alarm 46 is triggered when the reticle 30 of the speed vector is below the piloting curve 31 for a predefined duration, thus giving warning of the urgency of an avoidance maneuver.

I claim:

1. A method of assisting the piloting of an aircraft at low altitude, making it possible to detect obstacles in relief which are dangerous for said aircraft in the field in front of the aircraft wherein, on the basis of the maneuvering capabilities of the aircraft, a hypothetical curve is calculated, related to said aircraft and associated with an optimal theoretical trajectory for clearing an obstacle in a vertical plane; and wherein, in the field in front of the aircraft, the following steps are performed:

a) all the obstacles situated in a search area are determined;

b) the tops of said obstacles are compared with said hypothetical curve;

c) one of said obstacles is defined as a dangerous obstacle whose top is situated highest with respect to said hypothetical curve; and d) the coordinates of said top of said dangerous obstacle are determined.

2. The method as claimed in claim 1, wherein the field in front of the aircraft is subdivided into angular sectors and wherein, in each of said angular sectors, said steps a, b, c and d are performed.

3. The method as claimed in claim 2, wherein, in each of said angular sectors, the coordinates of a reference point situated at a predefined distance above the top of the dangerous obstacle are calculated, said predefined distance corresponding to the minimum desired height for overflying an obstacle.

4. The method as claimed in claim 3, wherein a piloting curve is determined, corresponding to a smoothed curve linking all said reference points.

5. The method as claimed in claim 4, wherein said piloting curve, as well as a characteristic sign indicating the position of the speed vector of the aircraft collimated at infinity are superimposed on an image of an external landscape.

6. The method as claimed in claim 4, wherein said piloting curve has a central part which includes points in space which are accessible to the aircraft with a predefined limit roll, said points being superimposed on the image of an external landscape.

7. The method as claimed in claim 4, wherein an offset piloting curve is calculated, determined in a way identical to said piloting curve, by using, in the calculation, modified coordinates of the dangerous obstacles, obtained in each case by a reduction according to the same ratio of the horizontal component of said coordinates.

8. The method as claimed in claim 4, wherein an auxiliary piloting curve is calculated, determined in a way identical to said piloting curve, by taking account of the obstacles situated at a longer distance from the aircraft than said dangerous obstacles.

9. The method as claimed in claim 4, wherein an optimal avoidance point is determined, corresponding to the point of the piloting curve towards which the aircraft has to steer in order to perform the optimal avoidance trajectory above the obstacles.

10. The method as claimed in claim 9, wherein, in order to determine said optimal avoidance point:

for each reference point of the piloting curve, a compensated relative distance D satisfying the relationship $D=h+kv$ is calculated, h being the horizontal distance and v the vertical distance between said reference point and the position of the speed vector, and k being a predefined coefficient;

said calculated compensated relative distances are compared with each other; and the optimal avoidance point is determined as being the reference point the compensated relative distance of which is smallest.

11. The method as claimed in claim 9, wherein a characteristic sign, arranged at said optimal avoidance point, is superimposed on the image of an external landscape.

12. The method as claimed in claim 9, wherein the coordinates of said optimal avoidance point are communicated to an automatic pilot of the aircraft, in order to perform automatic avoidance.

13. The method as claimed in claim 4, wherein a characteristic sign arranged at the point of said piloting curve through which said aircraft will pass while keeping its current roll is superimposed on an image of an external landscape.

14. The method as claimed in claim 1, wherein characteristic signs are superimposed on an image of an external landscape, which are arranged at the points in space corresponding to said determined coordinates.

15. The method as claimed in claim 1, wherein said hypothetical curve consists of a straight-line part, of length P, parallel to the speed vector of the aircraft and of a circular arc, of radius R, depending on the maneuvering capabilities of the aircraft, for pitch-up and pitch-down, in the vertical plane.

16. The method as claimed in claim 15, wherein the length P of said straight-line part is proportional to the speed of the aircraft.

17. The method as claimed in claim 15, wherein the radius R of said circular arc satisfies the relationship $R=Rc+Rp$, with Rc the pitch-up limit radius, dependent on the pitch-up limit load factor, and Rp the pitch-down limit radius, dependent on the pitch-down limit load factor.

18. The method as claimed in claim 17, wherein, as pitch-down limit load factor, a fixed value is taken which the aircraft is capable of having throughout the flight envelope.

19. The method as claimed in claim 17, wherein, as pitch-up limit load factor, predefined values are used varying as a function of the speed of the aircraft.

20. The method as claimed in claim 17, wherein said pitch-up limit load factor is determined on the basis of the mass and speed of the aircraft and upon temperature and atmospheric pressure.

21. The method as claimed in claim 15, wherein, in each angular sector, said search area is limited to a distance L from the aircraft, satisfying the relationship $L=P+R$.

22. A device for implementing the method specified under claim 1, said device comprising:

a rangefinder sensor for measuring the direction and the distance of all the obstacles situated in the various search areas;

a computer linked to said rangefinder sensor for calculating said hypothetical curve on the basis of recorded data, defining the dangerous obstacles, and calculating the coordinates of the tops of these dangerous obstacles, the coordinates of the reference points and said piloting curve; and a visual display device linked to said computer, for presenting to the pilot of the aircraft, in a fashion superimposed on an external landscape or on an image of the external landscape, the characteristic signs of said coordinates, said piloting curve, as well as the characteristic sign indicating the position of the speed vector.

23. The device as claimed in claim 22, which includes an audible alarm, which is associated with a time base, which is linked to said visual display device and which is triggered when said speed vector is below said piloting curve for a predefined duration.

24. The device as claimed in claim 22, wherein said visual display device filters the variations in the piloting curve and presents to the pilot, progressively, the alterations in said piloting curve.

* * * * *